Inventors:
Patrick L. May
John R. Majkrzak
By Robert B.給 Atty

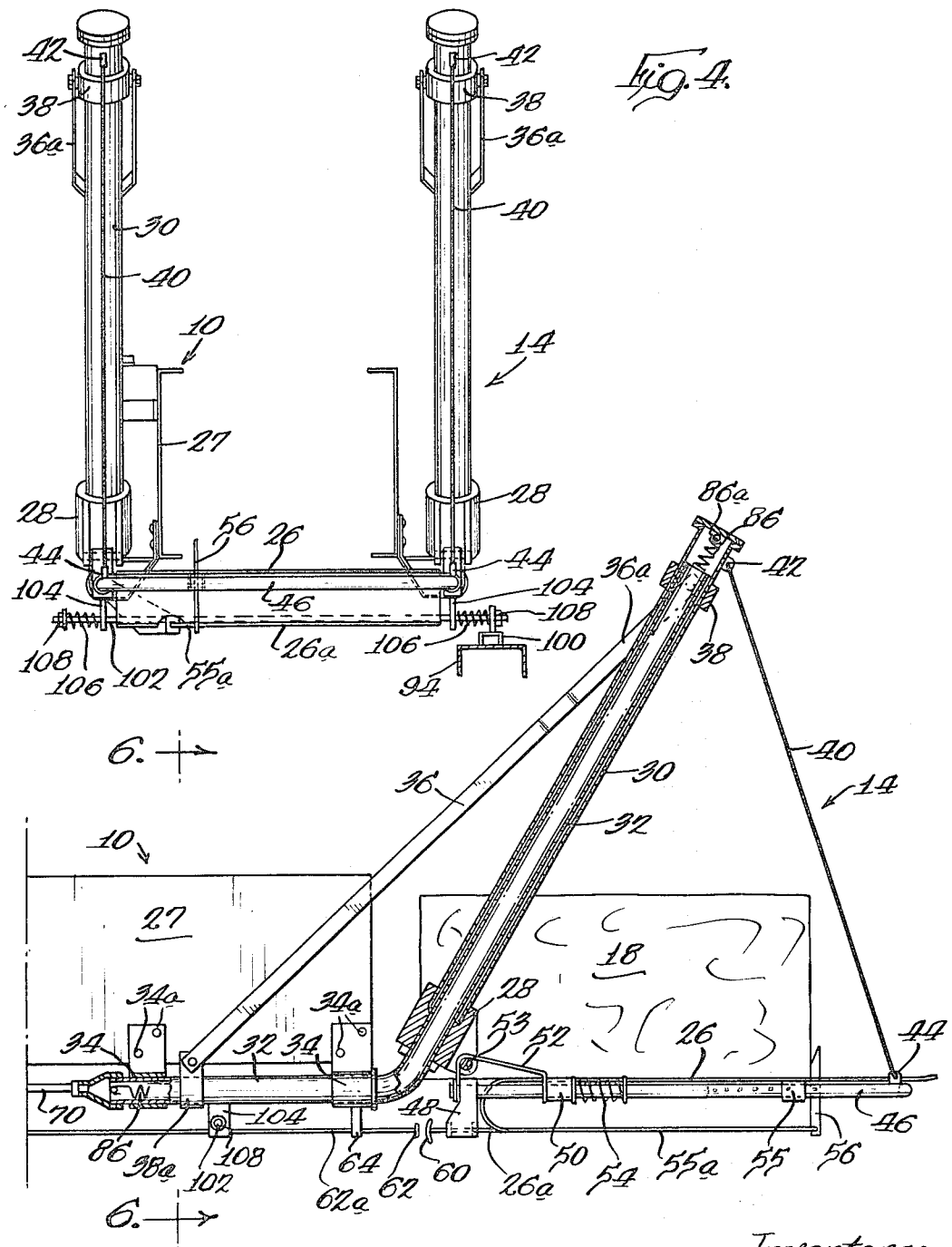

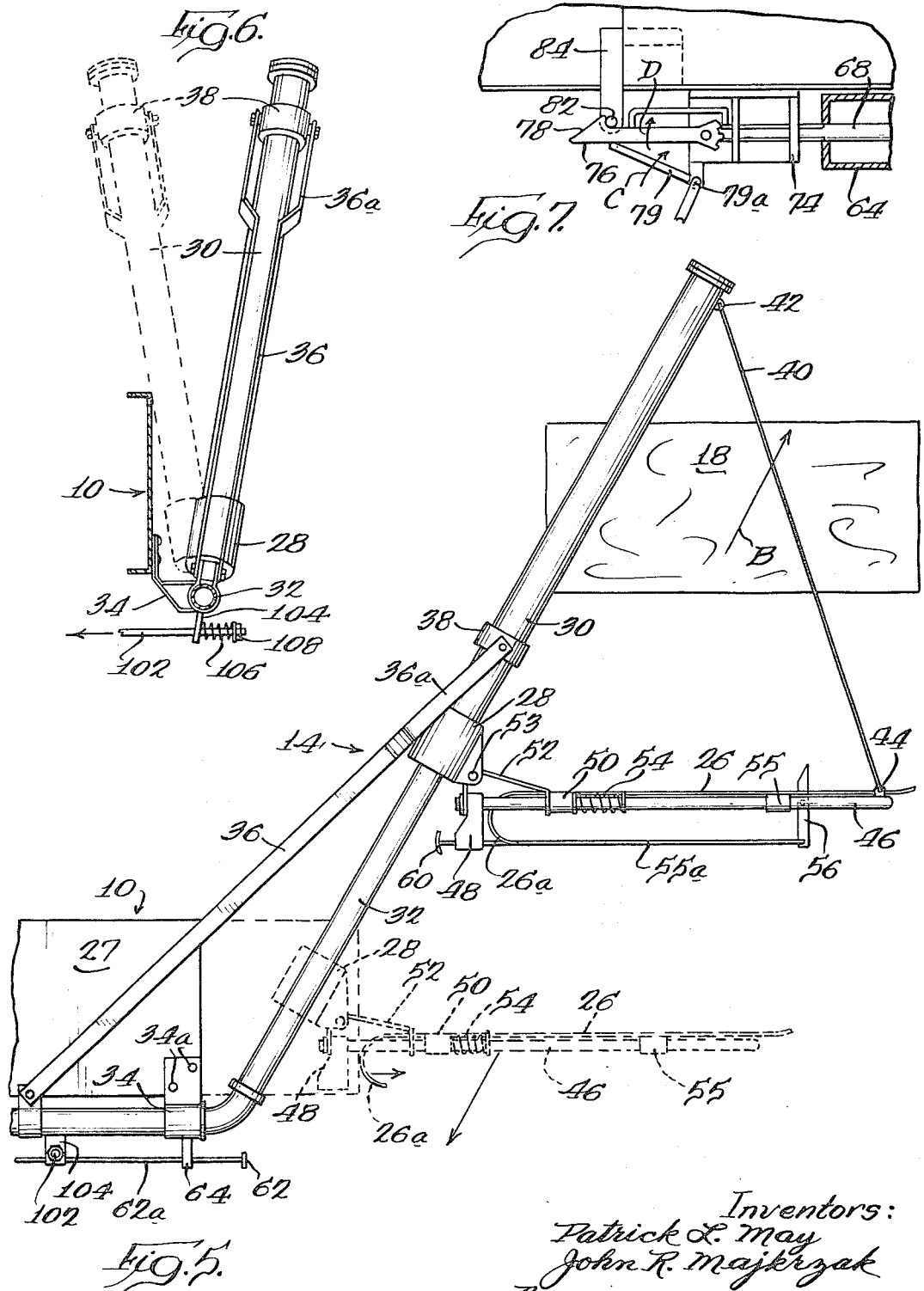

United States Patent Office 3,387,725
Patented June 11, 1968

3,387,725
HYDRAULIC RAM SLIDE BALE THROWER
Patrick L. May and John R. Majkrzak, Memphis, Tenn., assignors to International Harvester Company, Chicago, Ill., a corporation of Delaware
Filed Oct. 25, 1966, Ser. No. 589,435
11 Claims. (Cl. 214—42)

This invention relates to an improved mechanism for receiving a bale from a baling machine and throwing the bale to a hay wagon or similar receptacle closely spaced from the baler.

Hay baling apparatuses are usually towed vehicles which are pulled through a field by a prime mover, such as a tractor or the like. While being towed through the field, the baler collects quantities of hay, compacts it into a bundle and binds it and discharges the bundle out the rear thereof. In some instances, the bundles are discharged individually and deposited on the ground to be picked up at a later time. In other instances, mechanisms are provided on the rear of a hay baler for receiving a completed bale of hay and throwing the same into a wagon or similar vehicle which is hitched to the rear of a baler. This, of course, eliminates the need for a subsequent pass through the field to pick up the bales.

In those instances where the baler is provided with a bale throwing mechanism, a towed vehicle, such as a wagon is usually pivotally hitched to the baler. In field conditions it is not uncommon that the direction of travel will change due to such factors as ground contour, property line or field boundary change of direction, or the usual change of direction necessitated while making passes through a field during the performance of agricultural functions. Heretofore bale throwing mechanisms have not been responsive to these changes in direction to change the direction of flight of the bale which is launched from the rear of the baler. Consequently, some bales may be overthrown and miss the wagon which is towed behind the baler, or the bales may become collected at a point in the towed vehicle not intended for such collection. This may create problems where the towed vehicle is so constructed and arranged to carry a bale received thereon from a first primary receiving point to a secondary storage point.

Therefore, this invention is directed, in brief, to the provision of a bale throwing mechanism for attachment to the rear of a hay baler, which mechanism may be responsive to relative lateral displacement of a vehicle towed at the rear of the baler so as to continually direct a bale of hay into a trajectory which will cause the bale to land within the same general area of the towed vehicle at all times even though the direction of travel of the baler and vehicle may be misaligned relative to each other.

It is a primary object of this invention to provide a new and improved hay bale throwing mechanism.

Another object of this invention is to provide an improved hay bale throwing mechanism which is responsive to turning movement of a towed vehicle positioned at the rear of a hay baler so as to continually direct the bale of hay into a proper trajectory for depositing the bale in the same general area within the towed vehicle at all times.

It is a further object of this invention to provide a hay bale throwing mechanism which is responsive to turning movement of a towed vehicle connected to the rear of a hay baler without shifting the receiving position of the bale throwing mechanism relative to the hay baler so as not to interfere with the normal dispensation of bales of hay from the baler.

Other objects, features and advantages of the present invention will be apparent from the following:

FIGURE 3b is a continuation of FIGURE 3a showing the rear portion of a hay baler with the bale throwing mechanism of this invention connected thereto;

FIGURE 4 is a rear elevational view of the bale throwing mechanism of this invention;

FIGURE 5 is a fragmentary side elevational view of the rear portion of the hay baler showing the bale throwing mechanism of this invention in an extended bale throwing position;

FIGURE 6 is a fragmentary sectional view taken generally along the line 6—6 of FIGURE 4; and FIGURE 7 is a fragmentary enlarged view of a portion of the baler shown in FIGURE 3a illustrating in greater detail the connection between the piston rod and an element associated with the crank arm of the hay baler.

Figure 3A:
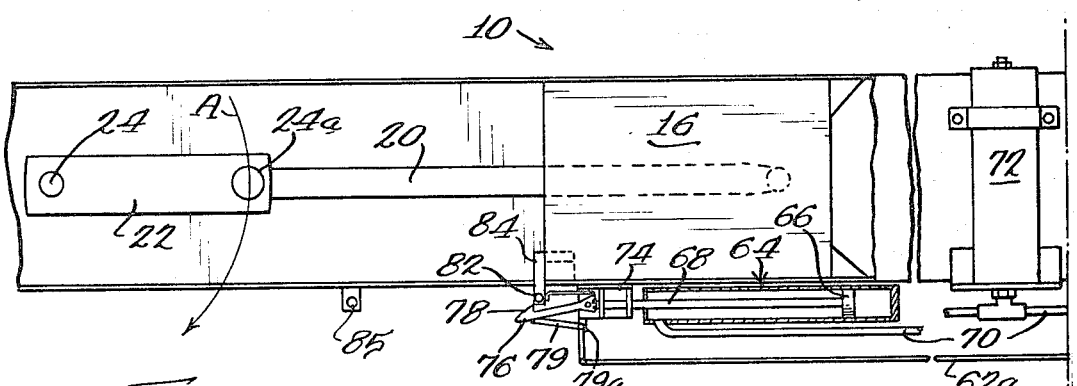
FIGURE 3a is a fragmentary broken view of a portion of the hay baler mechanism to which the bale throwing mechanism of this invention is connected.

Typically, in hay baling operations, a hay baler generally indicated 10 has pivoted to it a towed vehicle, such as a wagon 12 for receiving bales of hay from a bale throwing mechanism generally indicated 14 connected to the rear of baler 10. In the bale forming chamber 16 of the baler, the bale 18 is formed by the compressive action of a plunger mechanism 20 connected to a crank 22 which is pivoted to the baler at 24 and to the plunger at 24a for movement through an arc as generally indicated by the arrow A in FIGURE 3a. The compressive action afforded by the plunger compacts hay collected by the baler into a bundle-like configuration wherein other mechanism may provide the tying means for wrapping the bale as a unit.

The bale throwing mechanism includes a platform 26 which is generally horizontally disposed and has a downwardly turned forward end 26a. In an at-rest or bale-receiving position, platform 26 is in substantial horizontal alignment with the bottom of the rear 27 of the hay baler. Platform 26 is mounted for movement in a generally upright path by being connected to a pair of sleeves 28 by means to be described later. Each sleeve 28 is connected to a ram 30, a pair of which are slidably mounted over tubes or guide means 32 for movement of the platform between a retracted position, wherein the platform is at its at rest or bale receiving position, and an extended position which, when movement to said position is abruptly terminated, causes the bale to be pitched upwardly and rearwardly into a predetermined trajectory wherein the intended destination is the towed vehicle 12, the path of flight indicated by the arrow B in FIGURE 5.

Tubes 32 are rotatably mounted in collars 34 secured to the side of the baler by fastening means 34a. For assisting in supporting and guiding the rams 30 relative to each of the tubes 32, a bracing member 36 having a forked end 36a is connected to a collar 38 at the upper end of each ram 30 and connected to a collar 38a on each tube 32. The collar 38 serves as a guiding and bearing means for supporting the ram 30 as it is extended to the bale throwing position shown in FIGURE 5. In addition, bracing cables 40 run from a connection at 42 with the top of each ram 30 and a connection at 44 with the rearward end of each platform 26 to assist in supporting the platform in its generally horizontal disposition.

A generally U-shaped bar 46 supports platform 26 with the platform resting upon the base 46a of the bar 46 and a cross brace 46b which spans the two legs of the bar. A collar 48 is slidably mounted on each of the free ends of the bar and is connected to a second collar 50 spaced inwardly from collar 48 by means of an arm 52 which is hooked over pin 53 of sleeve 28 to pivotally mount the platform 26 with respect to each sleeve. A spring 54 normally biases the collar 50 and, therefore, collar 48 towards the free end of bar 46. These collars are connected with the platform 26 as well as another spaced collar 55a located on each leg near base 46a so that the platform 26 is slidably mounted with respect to bar 46.

If the platform 26 fails to return to its bale receiving position shown in FIGURE 3b with sufficient rapidity so that the next advancing bale is prematurely advanced out of the rear of the baler relative to the descent of the platform, an interruption in the normal cycle of operation of the baler and bale throwing mechanism may occur. Such an interruption could cause severe damage to components of the mechanism. However, the mounting of platform 26 for movement relative to the rear of the baler and the bale throwing mechanism and the provision of rounded surface 26a permits the platform to retract and absorb the rearward force of a prematurely advancing bale. Thus when the platform returns to its bale receiving position, it may continue to receive the advancing bale without interfering with the normal cycle of operation of the bale throwing mechanism.

A link member 55a is slidably supported in a lower extension of collar 48 and is pivotally connected to a trip lever 56 which protrudes upwardly through the rear end of platform 26. The forward end of link 55a is provided with a rounded leading edge 60 for engagement with the rearwardly facing end 62 of link means 62a. Link means 62a is also slidably mounted in bracket means, such as 64, spaced along the underside of the baler for to-and-for movement responsive to to-and-fro movement of the link means 55a when platform 26 is in a bale receiving position as shown in FIGURE 3b. As the bale of hay is received on platform 26 as shown in FIGURE 3b, the movement of the bale being pushed forwardly will trip lever 56, causing lateral displacement of link 62a.

This movement is transmitted to a piston and cylinder device 64 which is connected to the baler for supplying fluid under pressure to the tubes 30 for actuating rams 32. The piston and cylinder device 64 includes a piston 66 mounted on a rod 68. A fluid line 70 connects the cylinder 64 with the interior of each of the tubes 32. An accumulator 72 may be provided intermediate the line to minimize shock loads.

The free end of piston rod 68 is slidably mounted in a bracket 74 and pivotally supports a hooked extension 76 having a beveled free end 78. Link 62a has a right-angled end extension 78 which is also pivotally connected to bracket 74 at 78a and is secured by suitable means such as welding or the like to the hooked extension 76 of piston rod 68 so that movement of lever 56 will cause movement of rod extension 76.

A pin 82 carried on an arm 84 connected with plunger 20 projects outwardly from the baler in a position to engage the hooked extension 76 of rod 68. When the lever 56 is tripped by the action of a bale occupying platform 26, links 55a and 62a are moved towards the front of the baler, or the left as seen in the drawings, which causes the hooked extension 76 to engage pin 82 as shown in FIGURE 7, the movement being accomplished in the direction of the arrows C and D. At about this time, the crank 24 is moved to draw the plunger 20 rearwardly as part of the bale compressing function of the baler. The engagement between the pin 82 and the extension 76 also pulls piston rod 68 rearwardly, forcing fluid under pressure out of the cylinder through line 70 and into the interior of tubes 32. Continued rapid rearward movement causes the rams 30 to be rapidly extended from the position shown in FIGURE 3b to the position shown in FIGURE 5, drawing the platform 26 upward. Termination of the movement catapults the bale 18 into the trajectory generally indicated by the arrow B for flight through a path which will cause the bale to land within a desired area of the wagon 12.

As the crank 22 draws the plunger 20 to the rear of its stroke, the beveled forward end 78 of extension 76 engages a pin 85 on the baler which cams the extension 76 out of engagement with pin 82. The return spring 86 in the interior of each tube 32 which is connected to each ram at 86a, causes the rams to return to the position shown in FIGURE 3b wherein the platform 26 is ready to receive another bale 18, forcing fluid to return to the cylinder 64. As the bale 18 is pushed onto the platform 26, lever 56 is again tripped and the cycle is repeated.

Typically, a wagon 12 is connected by hitch means 90 to a baler wagon hitch 92 for pivoting about a point 92a. The bale throwing mechanism of this invention is further provided with a tilt control arm 94 which is also connected to the wagon hitch 90 for movement therewith and pivoted at 96 to leg 98 which extends outwardly from the side of the baler 10.

The tilt control arm 94 extends forwardly beyond the pivot 96 and is provided with an upstanding bracket 100 which receives one end of a rod 102 that extends transversely across the rear of the baler. Rod 102 is also slidably received in brackets 104 which are connected to the tubes 32. A spring 106 is provided on the outside of each bracket 104 about rod 102 and a nut or similar fastening means 108 is threaded to the extreme end. In addition, a nut or stop means 110 may be positioned on rod 102 inside each bracket 104.

Figure 1:
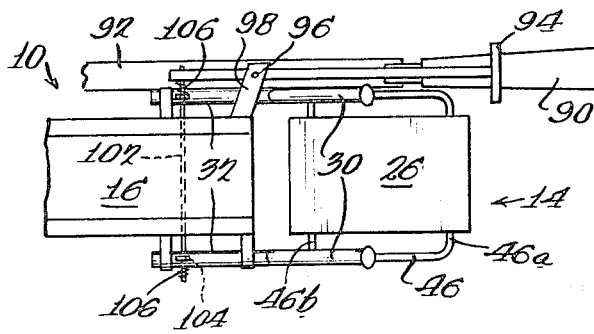
FIGURE 1 is a fragmentary diagrammatic top plan view showing a portion of the rear of a hay baler with the bale throwing mechanism of this invention secured thereto and a wagon pivoted to the hay baler, the baler and wagon generally in alignment with each other.
Figure 1:
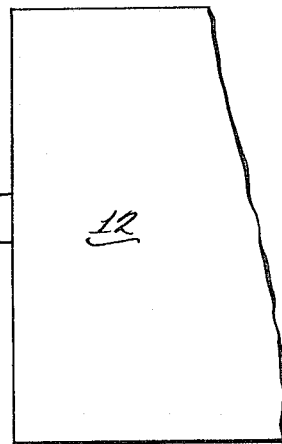
Figure 2:
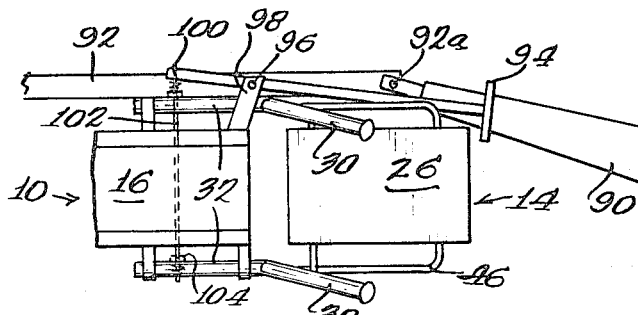
FIGURE 2 is a view similar to FIGURE 1 showing relative misalignment between the baler and the wagon.
Figure 2:

In operation, as the wagon hitch 90 turns as shown in FIGURE 2, it pivots about point 92a which pivots the tilt control arm 94 about the pivot 98 and pulls the connecting rod 102, causing the same to be laterally displaced with relationship to the baler. As the initial minor lateral displacement is absorbed by the springs 106, further lateral displacement causes one of the nuts 108 to engage the lower portion of one of the brackets 104 and one of the stops 110 to engage the other bracket 104, pivoting tubes 32 relative to collar 34 and initiating a vertical deflection in the upright portion of each of the tubes. Thus, as the platform 26 is subsequently raised by the rams 30, the platform will be appropriately vertically deflected so that the bale will be launched into a trajectory which will cause the bale to be guided into the same general area of reception in the wagon 12 as when the wagon is in line with the baler.

Since this guiding is accomplished by deflecting the upstanding tubes, the platform 26 is not substantially moved from its bale receiving position adjacent the rear of the baler so that it will continue to receive bales 18 from the rear of the baler in the usual fashion without interfering with the orderly dispensation thereof. However, as explained, when the wagon and baler are turning relative to each other, the platform 26 will be guided upwardly by the rams 30 in an appropriately deflected path to insure that the bales 18 will be guided into the proper area of the wagon 12.

From the foregoing it can be seen that the bale throwing mechanism of this invention is responsive to relative misalignment or turning movement between the hay baler and a towed vehicle, such as a wagon or the like, so as to continually urge a bale of hay to a proper trajectory for landing the bale within a desired predetermined area within the towed vehicle and preventing overshooting of the bale relative to the vehicle. In addition, the bale throwing mechanism is actuated by action obtained from the crank arm of the baling chamber and therefore it does not require an independent power source for the actuation of the cylinder device which provides the fluid under power for actuating the ram. Furthermore, the bale platform is connected to the rams and is so constructed and arranged that if the platform does not return in time to receive the next bale, or if the next bale advances prematurely outwardly from the bale chamber, the bale platform can absorb the interference created in such a case without substantially retarding or interfering with the normal operation of the bale throwing mechanism.

The foregoing detailed description has been given for clearness of understanding only, and no unnecessary limitations should be understood therefrom, as some modifications may be obvious to those skilled in the art.

We claim:

1. For use with a hay baler wherein hay is compressed and tied into bales and processionally advanced out of the rear thereof, a bale throwing mechanism, comprising: guide means at the rear of the baler extending upwardly in a generally rearwardly facing orientation; means mounting said guides to said baler for movement in an upright plane to change the vertical deflection thereof with respect to the baler; a bale receiving platform mounted on said guides for movement between a first bale receiving position wherein the platform is positioned adjacent the baler for receiving bales processionally fed out of the rear thereof, and a second bale launching position displaced from said first position wherein said bale is launched into a trapectory responsive to abrupt termination of movement of said platform; means on said guides for moving said platform; and a member connected to the guide means for vertically deflecting said guide means responsive to movement of the member to change the direction of flight of a bale launched by said platform, said member being constructed and arranged for operational connection to the hitch of a towed vehicle which may be hitched to the rear of the baler by means for moving said member responsive to misalignment of the towed vehicle relative to the baler so that movement of the towed vehicle relative to the baler will cause deflection of the guide means and change the direction of flight of a bale launched by said platform.

2. The bale throwing mechanism of claim 1 wherein said guide means is mounted for deflection about a point which generally lies in the plane of the platform member when the platform member is in the first bale receiving position so that the bale receiving position of the platform member relative to the rear of the baler is substantially unchanged by deflection of the guide means.

3. The bale throwing mechanism of claim 2 wherein the platform is connected to the guide means for rearward movement relative to the guides and relative to the rear of the baler so as to absorb movement of a next processionally advancing bale which may be relatively prematurely advanced out of the rear of the baler before the platform completely returns to its first position.

4. The bale throwing mechanism of claim 3 wherein the means for moving the platform is operatively connected to the plunger crank of the hay baler by link means connected to a lever on the platform in the path of bale travel so as to be movable responsive to the occupation of the platform by a bale of hay to move the link means and connect the means for moving the platform with the plunger crank of the hay baler.

5. The hay baler of claim 1 wherein the guide means comprises a pair of upwardly bent tubes pivotally mounted to the side of the baler; and the means for moving the platform is a ram slidably mounted over the tubes for movement between a position of retraction and positions of extension relative to the tube, said platform member being connected to said ram for movement therewith between said platform member first and launching positions.

6. The hay baler of claim 5 wherein the member for vertically deflecting the guide means is connected to the tubes for relative rotation of the tubes responsive to movement of a towed vehicle relative to the baler.

7. The hay baler of claim 6 wherein the tubes extend rearwardly from the rear of the baler and are bent upwardly and a rod extends generally transversely across the tubes and is connected thereto for rotating the tubes relative to their mounting on the baler responsive to lateral deflection of the rod, and wherein a link member is connected to the rod and constructed and arranged for connection to a wagon hitch so that movement of the wagon hitch will move the link, causing lateral deflection of the rod and thereby rotating the tubes relative to their mounting with the baler to vertically deflect the tubes for guiding the platform in a launching path which will correspond to movement of the wagon.

8. The hay baler of claim 7 wherein the platform is connected to the rams for rearward movement relative to the rear of the baler so as to absorb movement of a next processionally advancing bale which may be relatively prematurely advanced out of the rear of the baler before the platform returns to its bale-receiving position.

9. The hay baler of claim 8 wherein the means for moving the platform is operatively connected to the plunger crank of the hay baler by link means connected to a lever on the platform in the path of bale travel so as to be movable responsive to occupation of the platform by a bale of hay to move the link means and connect the means for moving the platform with the plunger crank of the hay baler.

10. The hay baler of claim 8 wherein a trip lever is mounted on the platform in the path of travel of a bale processionally advanced out of the rear of a baler onto the platform, the trip lever being connected to a link means which is mounted on the platform for to-and-fro movement responsive to the lever being stricken by an advancing hay bale, and wherein the baler is also provided with a link means which is mounted for to-and-fro movement relative to the baler, said baler link means being generally in alignment with the platform link means when the platform is in the bale receiving position so that movement of the trip lever responsive to advancement of the bale will cause movement of said platform link means which, in turn, will cause movement of said baler link means; a piston and cylinder device on said baler having a latch portion movably mounted on the free end of the piston rod and connected to the baler link means for movement responsive to to-and-fro movement of said link means, and an arm means connected to the plunger crank of the hay baler in a position to engage the latch portion of the rod of the piston and cylinder device and to pull the rod therewith when the link means moves the latch portion into engagement with the arm means responsive to movement of the trip lever so that movement of the plunger crank will pull the rod outwardly of the cylinder to provide fluid under pressure to the tubes and force the rams upwardly with sufficient rapidity to launch the bale from the platform.

11. The hay baler of claim 10 wherein means are provided in the path of travel of the piston rod for disengaging the connecting end of the rod from the arm means generally at the end of the stroke of the hay baler plunger crank to terminate the movement of the rams relative to the tubes, and wherein said rams are provided with means for returning the same relative to the tubes to return the platform to the bale receiving position.

References Cited

UNITED STATES PATENTS

| 3,087,600 | 4/1963 | Richey | 198—128 |
| 3,166,204 | 1/1965 | De Buhr | 214—42 |

ROBERT G. SHERIDAN, *Primary Examiner.*